Nov. 16, 1948.   P. ANDERSON ET AL   2,454,248
ICE GLIDER
Filed May 11, 1945
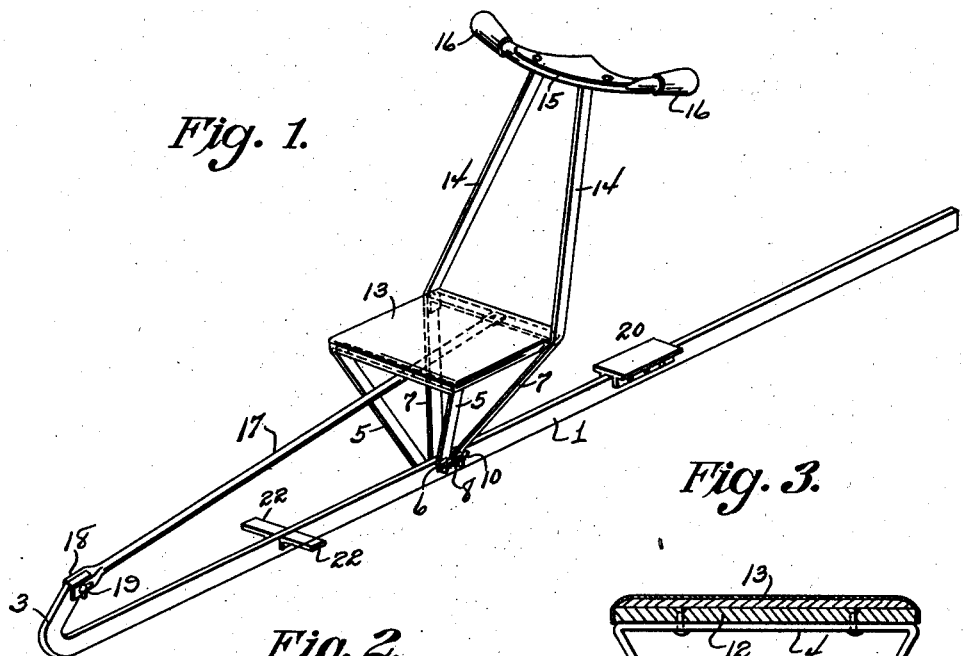
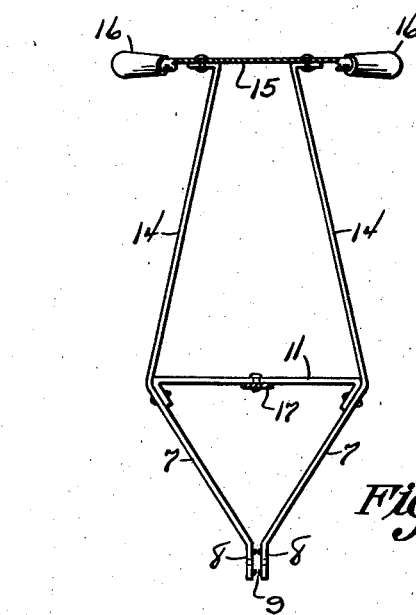
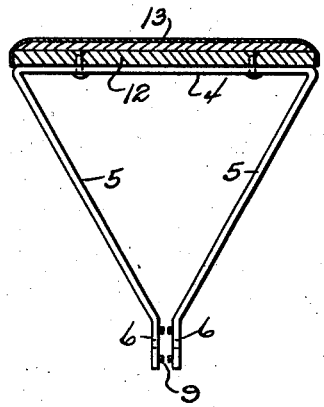
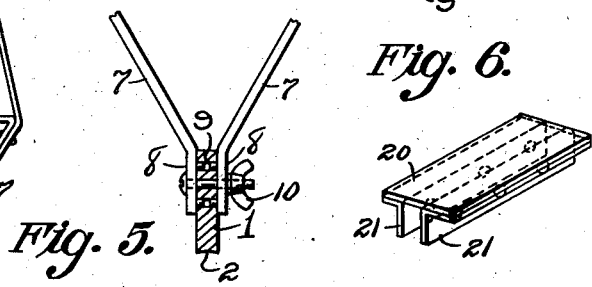
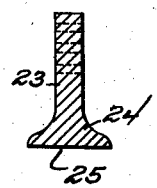
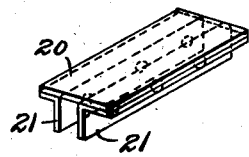
Paul Anderson
Bernard Anderson
INVENTORS Patented Nov. 16, 1948

2,454,248

UNITED STATES PATENT OFFICE 2,454,248

ICE GLIDER

Paul Anderson and Bernard Anderson,
Clifton, N. J.

Application May 11, 1945, Serial No. 593,260

4 Claims. (Cl. 280—23)

This invention relates to sleds, and its general object is to provide a sled of the single runner type for use on either ice or snow, in that it includes interchangeable runners, one that is relatively narrow and hollow ground for ice and the other having a relatively wide bottom face for snow, and the runners are individually and detachably associated with handled and seating means, in a manner so that either can be attached and removed in an easy and expeditious manner, but casual removal or displacement is practically impossible.

A further object is to provide a sled that includes a seat for a passenger or rider, and handled means for an operator, the handled means being rearwardly associated with and elevated above the seat for disposal in convenient reach of the operator while propelling the sled on level ground or riding thereon while coasting.

A further object is to provide a sled of the character set forth, that is simple in construction, inexpensive to manufacture and extremely efficient in use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a perspective view of the sled and illustrates the same equipped with an ice runner.

Figure 2 is a front view partly in section of the rear frame for the seat and which extends above the latter to act as a support for the handle bar.

Figure 3 is a view of the front frame for the seat and illustrates the top and cushion of the seat in section.

Figure 4 is a fragmentary view partly in section and illustrates the manner of attaching the runners with the seat frame.

Figure 5 is a vertical sectional view taken through the snow runner.

Figure 6 is a perspective view of the foot-rest for the operator.

Referring to the drawings in detail, it will be noted that the ice runner 1 as shown in Figures 1 and 4, is relatively long and narrow and is of the same width throughout its height and length, as well as provided with a hollow ground under face 2, so that its structure is substantially in accordance with that of an ice skate runner. The forward end of the runner 1 is bent to provide a rearwardly and upwardly inclined portion 3 having an opening at its upper end.

The seat as best shown in Figure 1 includes a front supporting frame having a horizontal upper portion 4 and depending portions 5, the latter extending from the ends of the upper portion, in converging relation and the lower ends of the portions 5 terminate in spaced parallel portions 6. The rear supporting frame for the seat also includes converging lower portions 7 that terminate at their lower ends in spaced parallel portions 8, and the portions 6 and 8 have superimposed dowel pins 9 fixed thereto and inwardly directed therefrom to be received in openings extending transversely through the runner. The parallel portions are likewise provided with openings between the dowel pin receiving openings and the middle openings are for the purpose of receiving the bolts of wing nut and bolt connections 10 for cooperation with the dowel pins for detachably securing the runner to the supporting frames, with the parallel portions disposed upon opposite sides of the runner, as shown in Figure 1, from which it will be noted that the lower portions of one frame are directed toward those of the other frame, so that the parallel portions are disposed in close proximity.

Secured to and bridging the upper ends of the portions 7 is a horizontally disposed cross member 11 having its ends bent at an inward angle to follow the inclination of the portions 7 and riveted or otherwise secured thereto so that the cross member 11 and the horizontal upper portion 4 are disposed in parallelism with each other to provide rests for the top 12 of the seat, the top being covered with suitable upholstering material 13, as best shown in Figure 3.

The rear supporting frame extends above the top 12 of the seat to provide what may be termed a back rest, and for that purpose the rear frame includes upper portions 14 formed on and rising from the lower portions 7 and inwardly directed toward each other in converging relation, as best shown in Figure 2. The upper ends of the upper portions 14 are bent outwardly to provide rests for the handle bar 15 that is riveted or otherwise secured thereto and the bar in the form shown is of arcuate formation and includes a flat intermediate portion and cross sectional rounded ends, the latter having secured thereto in the usual manner grips 16. The rear edge of the bar may be recessed in scalloped formation, as shown.

A brace rod 17 is provided for the seat and the rear end of the rod is flattened and riveted or otherwise secured to the cross member 11 midway its ends, as best shown in Figure 2, while the front end of the rod 17 is bifurcated as at 18 to receive the upper end of the inclined portion 3 between the bifurcations which are detachably secured to the portion 3 by a wing nut and bolt connection 19.

A footrest is provided for the operator and in the form shown it includes a rectangular top plate 20 having fixed to the under face thereof angle members 21 arranged for disposal upon opposite sides of the runner and fixed thereto by bolt and nut connections or rivets.

Footrest means is likewise provided for use by the occupant of the seat, and the latter means consists of a pair of strips 22 having one of their ends bent at right angles to the remaining portions thereof and fixed to the runner upon its opposite sides, so that the strips extend therefrom accordingly, with their upper faces flush with the upper face or edge of the runner, as clearly shown in Figure 1.

The snow runner 23 is shown in Figure 5 and while the runner 23 is relatively narrow for the major portion of its height throughout its length, the lower portion is thickened in outwardly flared formation, as at 24 to provide a relatively wide flat bottom surface 25 to prevent the runner from sinking into the snow, as will be apparent. The runner 23 is otherwise like the runner 1, in that the runner 23 is provided with an upturned forward portion for receiving the brace rod 17 and openings are provided in the runner 23 for receiving the dowel pins and bolt and nut connections of the leg portions of the seat.

From the above description and disclosure in the drawing, it will be obvious that the runners 1 and 23 are interchangeable and either one can be readily applied and removed with respect to the seat and handle structure in an easy and expeditious manner, due to the use of the wing bolt and nut connections 10 and 19. In the use of the sleigh, it will be further obvious that the passenger or rider will occupy the seat, while the operator stands upon the rear footrest and grips the handle bar, and the operator can use one foot for propelling the sleigh or both feet can be disposed upon the footrest while coasting.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:

1. A sled comprising a seat including a front supporting frame having a horizontal portion, portions depending from the ends of the horizontal portion in converging relation with respect to each other, a rear supporting frame including lower portions converging toward their lower ends, a cross member secured to and bridging the lower portions at the upper ends thereof and paralleling said horizontal portion, a top for the seat and fixed to the horizontal portion and cross member, upper portions converging toward their upper ends and formed on said lower portions, a handle bar secured to and bridging the upper ends of said upper portions, a relatively long runner having extending transversely therethrough a plurality of spaced openings, means on the portions depending from the ends of the horizontal portion and on the lower portions of said rear supporting frame, respectively, engaging said spaced openings whereby a definite rigid relationship between said frames and said runner is maintained, removable means for detachably securing the runner to the frames, bracing means for the seat and detachably secured to the runner, and footrests secured to the runner and arranged forwardly and rearwardly of the seat.

2. A sled comprising a seat including a front supporting frame having a horizontal portion, portions depending from the ends of the horizontal portion, a rear supporting frame including lower portions, a cross member secured to and bridging the lower portions and paralleling said horizontal portion, a top for the seat and fixed to the horizontal portion and cross member, upper portions included in the rear frame, a handle bar secured to and bridging the upper ends of the upper portion, a relatively long runner having openings therein, parallel portions formed on the lower ends of the depending portions and said lower portions respectively, inwardly directed dowel pins on said parallel portions and receivable in certain openings of the runner, means for disposal through the remaining openings of the runner for cooperation with the dowel pins for detachably securing the runner to the frames, and bracing means for the seat and detachably secured to the runner.

3. A sled comprising a seat including a front supporting frame having a horizontal portion, portions depending in converging relation from the ends of the horizontal portion, a rear supporting frame including lower portions converging toward their lower ends, a cross member secured to and bridging the lower portions at the upper ends thereof and paralleling said horizontal portion, a top for the seat and fixed to the horizontal portion and cross member, upper portions included in the rear frame and converging toward their upper ends from said lower portions, a handle bar secured to and bridging the upper ends of said upper portions, a relatively long hollow ground runner having an upwardly and rearwardly directed forward end, means including dowel pins detachably securing the runner to the lower ends of the depending portions and said lower portions, removable means for maintaining said portions against said runner and bracing means for the seat and detachably connected to the forward end of the runner.

4. A sled comprising a seat including a front supporting frame having a horizontal portion, portions depending in converging relation from the ends of the horizontal portion, a rear supporting frame including lower portions converging toward their lower ends, a cross member secured to and bridging the lower portions at the upper ends thereof and paralleling said horizontal portion, a top for the seat and fixed to the horizontal portion and cross member, upper portions included in the rear frame and converging toward their upper ends from said lower portions, a handle bar secured to and bridging the upper ends of said upper portions, a relatively long runner outwardly flared toward its lower edge to provide a wide flat bottom surface and having an upwardly and rearwardly directed forward end, means including dowel pins detachably securing the runner to the lower ends of the depending portions and said lower portions, removable means for maintaining said portions against said runner and bracing means for the seat and detachably connected to the forward end of the runner.

PAUL ANDERSON.
BERNARD ANDERSON.

REFERENCES CITED

The following references are of record in the file of this patent:

UNITED STATES PATENTS

| Number | Name | Date |
|---|---|---|
| 504,941 | Regnstrom | Sept. 12, 1893 |
| 841,447 | Ritzman | Jan. 15, 1907 |
| 1,111,005 | Carlson et al. | Sept. 22, 1914 |
| 1,140,805 | Ellerman | May 25, 1915 |
| 1,354,995 | Oldakowski | Oct. 5, 1920 |
| 1,497,903 | Halme et al. | June 17, 1924 |
| 2,096,893 | Gilbert | Oct. 26, 1937 |
| 1,663,060 | Rainey | Mar. 20, 1938 |

FOREIGN PATENTS

| Number | Country | Date |
|---|---|---|
| 32,600 | Sweden | Apr. 3, 1912 |
| 38,414 | Norway | Nov. 19, 1923 |
| 53,578 | Sweden | Jan. 24, 1923 |